United States Patent [19]

Athey et al.

[11] 3,911,943

[45] Oct. 14, 1975

[54] CONTROL CIRCUIT FOR DISHWASHER

[75] Inventors: Stuart E. Athey, Troy; Alan Lee Vore, Franklin; Donald E. Swihart, St. Paris, all of Ohio

[73] Assignee: Hobart Corporation, Troy, Ohio

[22] Filed: Oct. 25, 1974

[21] Appl. No.: 518,171

Related U.S. Application Data

[62] Division of Ser. No. 348,192, April 5, 1973, Pat. No. 3,844,299.

[52] U.S. Cl.................................. 137/341; 417/32
[51] Int. Cl.².......................................... B08B 3/02
[58] Field of Search...... 137/341, 565; 417/32, 292; 134/57 D, 57 DL, 113

[56] References Cited
UNITED STATES PATENTS

| | | | |
|---|---|---|---|
| 2,692,604 | 10/1954 | Walker | 137/57 DL |
| 2,975,347 | 3/1961 | Schaefer | 417/32 X |

Primary Examiner—Henry T. Klinksiek
Attorney, Agent, or Firm—Biebel, French & Bugg

[57] ABSTRACT

An electrical circuit for controlling various functions in a plurality of dishwashers having common features of a washing chamber containing a quantity of washing solution, means for heating the washing solution, a temperature sensor arranged to respond to the temperature of the solution, a pump for circulating washing solution through a spray head, and an electric motor for driving the pump. The control circuit includes a plurality of circuit boards for controlling the sequence of operation of the dishwasher, overheating protection for the pump motor, and the means for heating the washing solution. Many circuit boards contain indicating lamps in the form of light emitting diodes to indicate proper operation of the circuit. Other circuit boards include optional features, such as automatic initiation of the washing cycle upon the closure of the door.

6 Claims, 8 Drawing Figures

CONTROL CIRCUIT FOR DISHWASHER

This is a division of application Ser. No. 348,192, filed Apr. 5, 1973, now U.S. Pat. No. 3,844,299, issued on Oct. 29, 1974.

BACKGROUND OF THE INVENTION

Electric motors having a horsepower rating greater than one horsepower are required under the National Electric Code to have some means of disconnecting the power source to the motor in the event the motor windings exceed a predetermined temperature. These motor protection devices take many forms and usually require electrical circuitry external to the motor.

Commercial dishwashers frequently employ motors having horsepower rating requiring motor protection devices. These dishwashers also include means for heating a reservoir of water, means for sensing the temperature of the water and an electrical control circuit for controlling the water heating means.

Domestic dishwashers also employ temperature responsive elements for protecting the pump motor from excessive temperatures and for controlling the temperature of the heater used in the washing and rinsing cycles of the machine. Heretofore, thermal responsive devices, such as bimetallic elements, have been employed for all of the temperature control functions in these domestic dishwashers.

In both domestic and commercial dishwashers, the motor protection circuit and the water temperature control circuit have often been designed separately and on an individual basis for each model of dishwasher manufactured. This manufacturing technique is expensive due to the large number of replacement parts necessary and the time spent in training repairmen to perform field service on the entire line of equipment produced by one manufacturer.

For example, one type of motor protection device is a thermally responsive element which responds to the temperature of a heater inserted in series with and responding to the current in the motor circuit. Theoretically, the temperature of the motor is related to the current input to the motor windings, and therefore the temperature of the heater is sensed by the thermally responsive device which will open the circuit to the motor in the event of overload. Obviously, this technique can only approximate the temperature of the motor but cannot sense the actual temperature within the motor windings where damage from motor over-temperature is most likely to occur.

Furthermore, the heater elements are selected on the basis of the current drawn by the motor, thus requiring different heaters for motors operated from different power sources and motors of varying horsepower ratings. This requires service personnel to stock a large number of different heater elements, and should a particular heater element be depleted from the stock at the time a serviceman is called upon to service an installed dishwasher, it is possible that he will replace the heater element with either a more or less sensitive element. If the heater element is less sensitive, it might result in overheating and possible failure of the motor at some later time; if it is too sensitive, then current to the motor might be interrupted although the motor temperature has not exceeded the specified value.

SUMMARY OF THE INVENTION

This invention relates to a novel control circuit for use particularly with a wide variety of dishwashers having the common features of a washing chamber with a tank at its bottom for containing a quantity of washing solution, a means for heating the solution, a temperature sensor arranged to respond to the temperature of the solution in the tank, means for spraying the washing solution over soiled articles placed within the washing chamber, a pump connected to circulate the washing solution from the tank through the spray head and an electric motor for driving the pump. The electric motor includes heat sensing means responsive to the temperature of the motor and circuit means for protecting the motor from overheating.

The control circuit common to all different types of dishwashers has connections for the motor temperature sensor, the current control to the motor, the washing solution temperature sensor, and the control of the washing solution heating means. Various optional features may be included in one or more models of dishwashers, with the control circuit including terminal connections and control components related to those particular functions.

For some models of dishwashers, the control circuit includes a timing system incorporating a counter connected to the source of alternating current for providing a plurality of outputs relating to the frequency of the current source and gate means for controlling the operating cycle of the washer. For example, in a washer having means for washing and means for rinsing articles placed within the machine, the control circuit will control the sequence and duration of the wash and rinse means. The initiation of this operation may be either manual or automatic by means of a switch operated upon the closure of the washer door. Signaling means may also be provided when the washer has completed its programmed cycle of operation.

By using common circuit boards for the same function within different types of dishwashers and by combining these circuit boards needed for the different functions, including optional features, the inventory of circuit boards required for servicing a large number of different types of dishwashers is reduced. Also, by making the circuit boards easily removable and of similar design, servicing of the equipment employing this concept is made easier. Furthermore, by building into the circuit boards indicating lamps, preferably in the form of light emitting diodes, proper operation of each circuit board can be determined visually by a service man thus enabling him to locate any malfunction quickly.

Accordingly, it is an object of this invention to provide a novel control circuit for use with a plurality of different dishwashers wherein the function controlled by these circuits are incorporated on printed circuit boards which may be easily removed and reinstalled, with many of the circuit boards being useable with different types of equipment.

Another object of the invention is to provide a control system for use with any one of a plurality of different types of dishwashing machines wherein the control circuit has circuit connections to a wash solution temperature sensor, wash solution heater, pump motor and pump motor winding temperature sensors, the circuit boards also having terminal connections for circuit connections corresponding to the different functions to be sensed and/or controlled, and function control boards removably connected to said terminal connections and containing control components responsive to the wash solution temperature sensor and the motor winding temperature sensor and operative to prevent overheating of the motor and to maintain the wash solution within a predetermined temperature range.

Another object of this invention is to provide a control circuit for controlling the sequence and duration of the wash and rinse means within a dishwasher by including within the control circuit counter means connected to a source of alternating current or other clock signal source for providing a plurality of outputs related to the frequency of the clock signal source, first gate means having inputs connected to selected outputs of the counter means and an output connected to the wash means for controlling its operation, and second gate means having inputs connected to selected outputs of the counter means and an output connected to the rinse means for controlling its operation.

Other objects and advantages of the invention will be apparent from the following description, the accompanying drawings and the appended claims.

DESCRIPTION OF THE PREFERRED EMBODIMENTS

Figure 1:
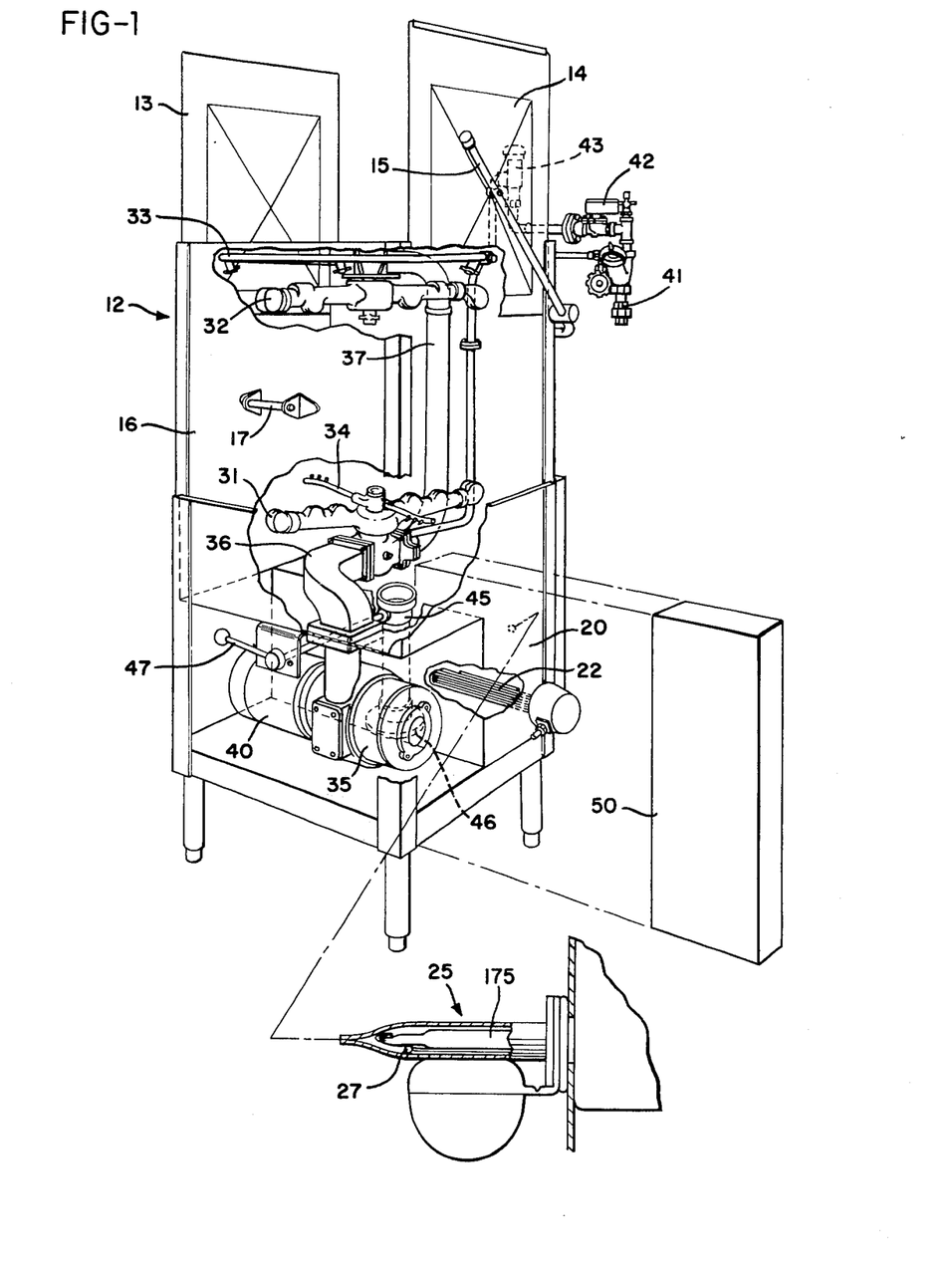
FIG. 1 is a perspective view with a portion broken away to reveal internal components, of one type of commercial dishwasher employing the control circuit of this invention.

Referring now to the drawings, and particularly to FIG. 1, a semiautomatic, rack type commercial dishwasher 10 is shown which includes a wash chamber 12, entry to which is provided by doors 13 and 14 movable from a lower position to an upper position by means of a wrap around handle 15. A third door at the front of the dishwasher serves as an inspection door 16 and may be lifted by means of handle 17.

A wash tank 20 located in a lower part of the dishwasher is heated by means of an electric immersion heater 22. The water level is sensed by means of a float assembly 25, and the water temperature is sensed by means of a thermistor 27 built into the water level assembly. The wash tank 20 may also be heated by means of a gas fired burner located beneath the wash tank or by steam.

Within the washing chamber 12 are revolving wash arms 31 and 32 and rinse sprayers 33 and 34. The washing solution contained in the wash tank 20 is pumped to the wash arms 31 and 32 through manifolds 36 and 37 by means of a self-draining pump 35. The pump 35 is driven by an electric motor 40. Rinse water is supplied through a connection 41 to the rinse sprayers 33 and 34 under the control of a rinse solenoid 42. A vacuum breaker 43 is provided on the downstream side of the rinse valve.

Excess water in the wash tank is removed by means of an overflow drain tube 45, the upper part of which serves to limit the level of water in the wash tank. The lower part of the drain tube 45 fits within a drain assembly 46 at the lower part of the tank and is closed when the drain tube is in its lowermost position. The drain tube 45 may be raised by means of handle 47 which rotates a cam to lift the drain tube 45.

A door interlock may be provided to lock the doors 13 and 14 in the lowermost position during operation of the dishwasher. This interlock includes a solenoid which moves outwardly to prevent the upward movement of both doors. A safety switch is also included on some models to terminate the dishwasher operation if the doors are opened. This switch may also be used to initiate the dishwashing cycle, as will be explained.

Figure 2:
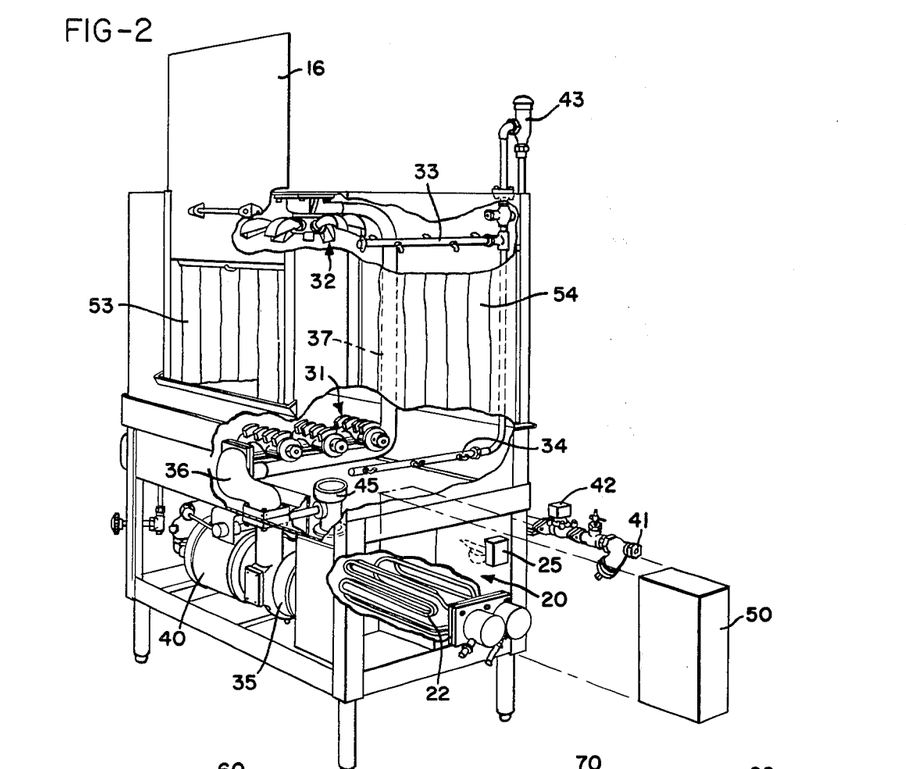
FIG. 2 is a perspective view, also with a portion broken away to reveal internal components, showing another type of commercial dishwasher employing the control circuit of this invention.

FIG. 2 shows a conveyor type dishwasher which is similar in many respects to the dishwasher of FIG. 1. One principal difference is in the use of flexible curtains 53 and 54 to allow a rack of dishes or other soiled articles to be moved by means of a conveyor into the interior of the dishwasher. Otherwise, the dishwasher of FIG. 2 is basically the same, and the same reference numerals are used for like components.

A control circuit 50 is attached to the dishwashers of FIGS. 1 and 2 and includes connections to the various control and sensing devices within the dishwashers for controlling the operation thereof. The control circuit includes a circuit board common to a plurality of different models of dishwashers, and also includes other circuit boards for controlling specific optional functions peculiar to a particular dishwasher.

Figure 3:
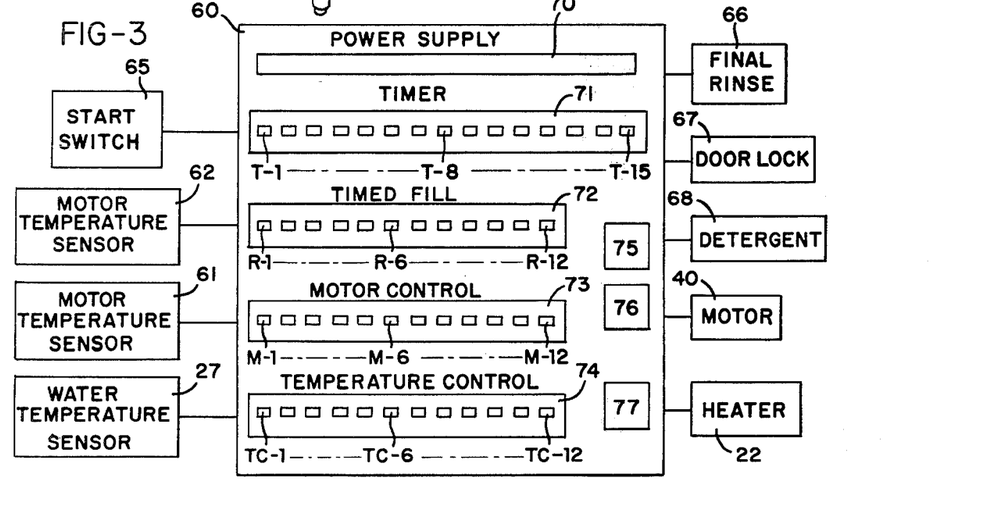
FIG. 3 is a block diagram showing a control circuit, the basic components of which may be used with several types of dishwashers, including those shown in FIGS. 1 and 2.

Reference is now made to FIG. 3 which is a block diagram showing the control circuit used with the above mentioned dishwasher types. It is understood that this control circuit may be used with many different models of dishwashers, thus reducing the inventory required to service a large variety of dishwasher types. The control circuit includes a master board 60 common to many types of machines and having circuit connections to the water temperature sensor 27, the water heater 22, motor temperature sensors 61 and 62, and motor 40. On those models having a door switch, a door switch or start switch 65 is also connected to the master control board 60. The master board may also control other optional features such as a final rinse solenoid 66, a door lock solenoid 67 and a detergent dispenser 68.

The master control board 60 includes several functional control boards removably connected to the master board and containing control components which are responsive to water and motor temperature sensors and the start switch and which control the operation of the motor, heater, and the optional features mentioned above. These function boards are actually printed circuit boards connected to the master board by quick release terminal strips. The technique of assembly and installing the function boards on the master boards and the master board within a control console is more fully described in co-pending application Ser. No. 323,538, filed Jan. 15, 1973.

In the preferred embodiment of the invention, the boards mounted on the master board include a power supply 70, a timer circuit 71, an optional timed fill circuit 72, a motor control circuit 73, and a temperature control circuit 74. Each of these circuits will be described in more detail hereinafter.

Also shown in FIG. 3 are the main input power transformer 75 and contactors 76 and 77. The main power supply transformer 75 has multiple taps and therefore can be used with power sources of widely different voltages. The contactor 76 controls current to the motor 40 while contactor 77 controls the current to the heater 22.

Figure 4:
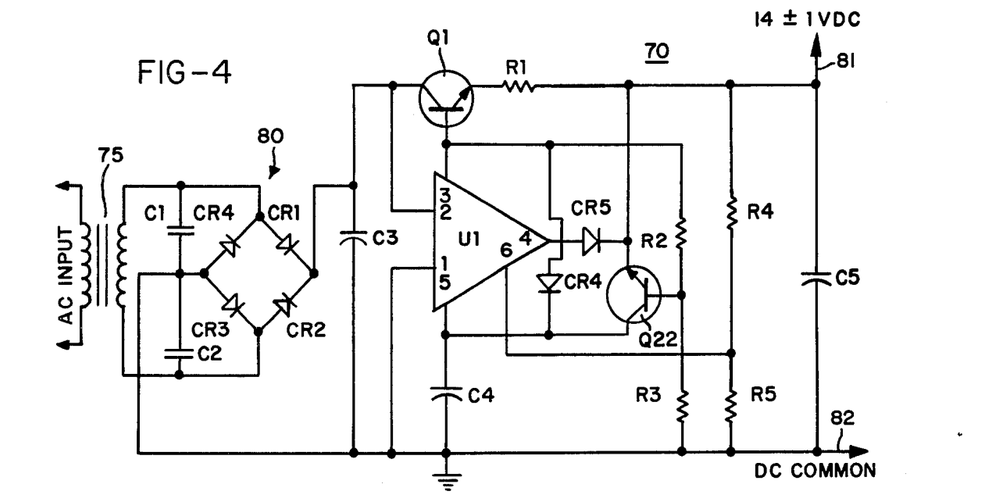
FIG. 4 is an electrical schematic diagram of a power supply circuit.

FIG. 4 illustrates the power supply circuit contained in a printed board 70. The power supply provides regulated direct current to each of the control circuits on the master control board. The circuit receives the voltage output from the secondary winding for the output of the main transformer 75 and rectifies it by means of a full wave bridge rectifier 80, including four diodes CR1–CR4.

The output of the rectifier 80 is filtered by capacitor C3 and this output applied to a voltage regulator circuit U1, the output voltage level of which is determined by resistors R4 and R5. A bypass transistor Q1 functions to increase the current capacity of the voltage regulator. Transistor Q22 functions as a current fold back transistor. As the emitter of Q22 is brought closer to ground or is shorted to ground, current will flow in the base-emitter circuit to cause Q22 to conduct and to begin to turn off the regulator U1. Resistors R2 and R3 set the point at which current fold back begins. The output of the power supply appears between lines 81 and 82 and is 14±1 VDC.

Figure 5:
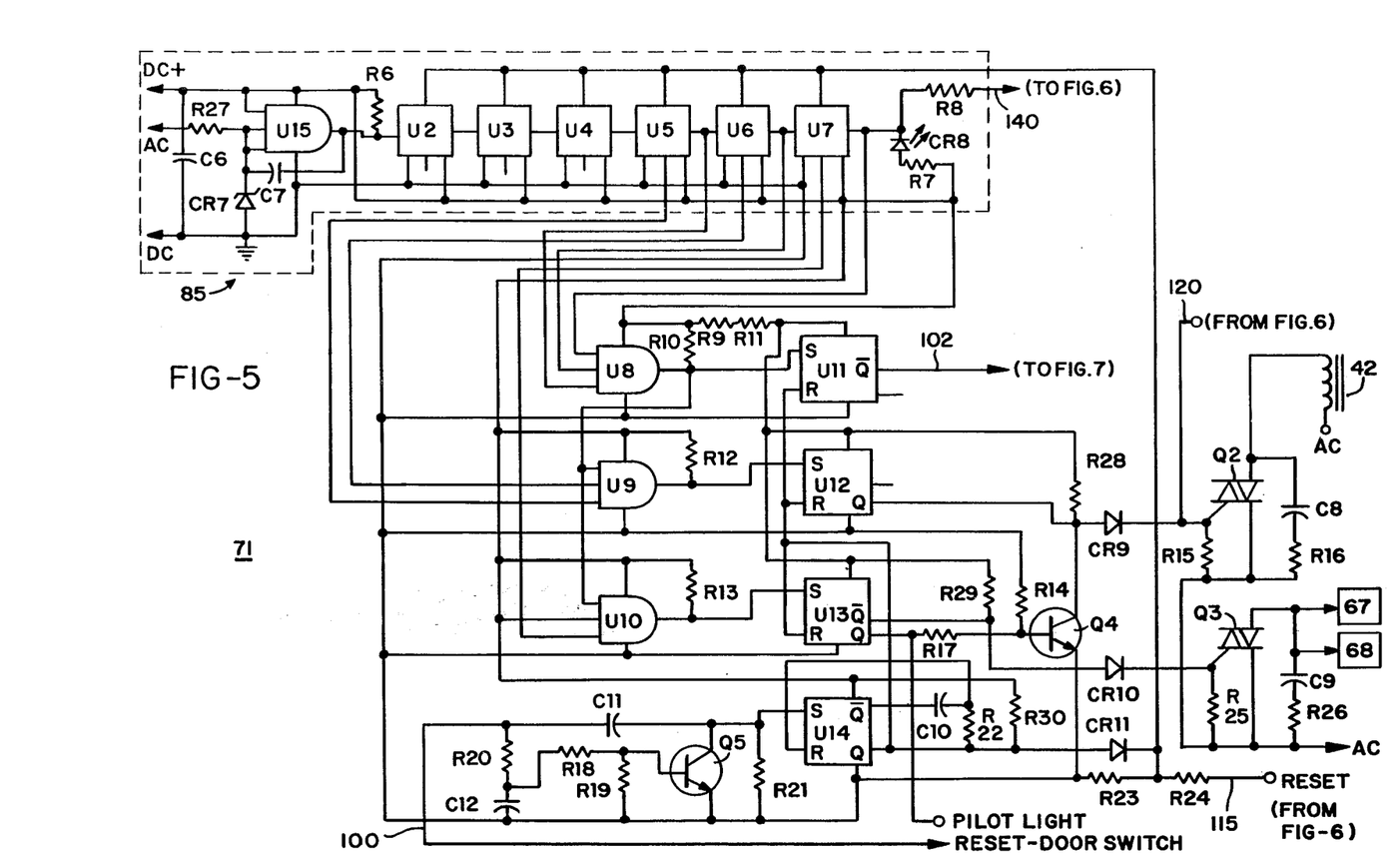
FIG. 5 is an electrical schematic diagram of a timer circuit for controlling the sequence and duration of various components within a dishwasher such as shown in FIG. 1.

FIG. 5 shows a timing function circuit contained on the timer board 71. The timer circuit is primarily for the dishwasher shown in FIG. 1 and controls the sequence and duration of the wash and rinse cycle of the dishwasher. The circuit includes a counter connected to the source of alternating current which provides a plurality of outputs occurring in timed relation to the frequency of the alternating current source. A plurality of gate means are provided to control the duration of the wash by controlling current through the motor 40, a period of dwell, and the duration of the rinse by controlling the solenoid actuated rinse valve. This circuit also includes a pilot light to indicate proper operation, and an optional door lock and/or detergent dispenser.

The timer circuit 71 includes a counter 85 consisting of a plurality of dual flip-flops U2-U7, each section of which divides the line frequency by two. As shown in FIG. 5, six dual flip-flops are shown to divide the line frequency by a factor of $2^{12}$. The outputs from the last three dual flip-flops U5, U6 and U7 are applied to three gating circuits U8, U9 and U10. Gate circuit U8 operates after a 45 second delay to turn off the wash pump motor; gate circuit U9 operates after a fifty second delay to open the rinse valve to begin the rinse cycle after a five second dwell; and gate circuit U10 terminates the rinse cycle at 62 seconds, thus allowing the rinse to operate for a total of 12 seconds.

Gate U8 has its output connected to the set input "S" of flip-flop U11 while gates U9 and U10 have their outputs connected to the set inputs of flip-flops U12 and U13, respectively. Each of the flip-flops U11-U13 have a reset input "R" and two outputs "Q" and "$\overline{Q}$". These flip-flops are known to those skilled in the art as R-S flip-flops, and when reset, Q is low and $\overline{Q}$ is high. To obtain a set condition, the input of the reset must be held low while the set input changes from low to high. To obtain a reset condition, the set input must be held low while the reset input changes from low to high.

The timing circuit is reset by connecting line 100 to a positive source of DC, such as through a door switch operable when the doors of the dishwasher are closed. This causes flip-flop U14 to set, and when this occurs, each of flip-flops U11– U13 will be reset. The voltage pulse which caused flip-flop U14 to set was coupled to the set input through capacitor C11, and therefore was only a momentary pulse. After a time delay determined by capacitor C12 and resistor R20, transistor Q5 is gated into conduction, thus holding the set input of flip-flop U14 in a low state to permit it to be reset at the appropriate time.

The $\overline{Q}$ output of flip-flop U11, when high, allows gate current to flow through a triac on the motor protection board (FIG. 7) through the interconnection of line 102. This triac controls the motor contactor coil and thus the current through the wash motor. This motor will run until gate U8 decodes a signal from counters 85 indicating that a time delay of 45 seconds has elapsed. After forty-five seconds, the set input of flip-flop U11 goes high, thus setting flip-flop U11 and removing the gating current to the triac to discontinue motor operation.

After a time delay of fifty seconds, gate U9 causes the set input of flip-flop U12 to go high, and thereby set flip-flop U12 and this causes current to flow to the gate of triac Q2 through resistor R28 and diode CR9. Triac Q2 controls the current through rinse valve solenoid 42, thus initiating rinsing action within the wash chamber of the dishwasher. After 62 seconds, an output from gate U10 will cause the set input of flip-flop U13 to go high which gates transistor Q4 into conduction, thus removing the gate current from triac Q2 thereby deenergizing the rinse valve solenoid 42 and terminating the rinse cycle. At the same time, the $\overline{Q}$ output of flip-flop U13 inhibits the current flowing to the gate of triac Q3 thus deenergizing the optional door lock 67 and/or detergent dispenser 68.

The cycle of operation is initiated upon the application of a signal to line 115 (from the circuit of FIG. 6) which causes each of the counters in the counting circuit first to reset and then to start counting under control of the input frequency applied to the counter.

When a timed fill option is employed, a signal on line 120 will gate triac Q2 into conduction, thus causing the rinse valve solenoid 42 to energize and to introduce water into the washing chamber and thus into the wash tank for a predetermined period of time, as determined by that circuit. As may be seen, diode CR9 prevents this signal, from the FIG. 6 circuitry, from being applied to the remainder of the timing circuit shown in FIG. 5.

Figure 6:
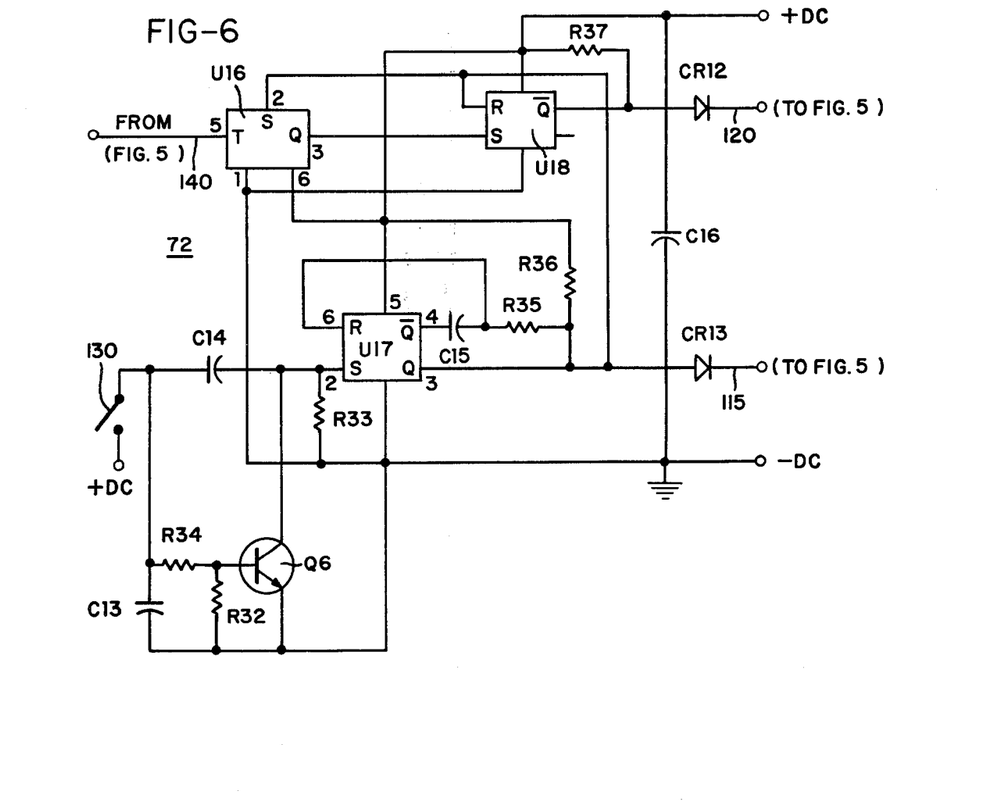
FIG. 6 is an electrical schematic diagram of an optional circuit controlling the time during which the wash tank is initially filled.

Reference is now made to FIG. 6 showing the timed fill board circuit. This is an optional circuit which may be used initially to fill the washing solution tank by energizing the rinse solenoid valve for a predetermined length of time. The operating cycle is initiated by momentarily closing a fill switch 130 which generates a pulse which is transferred through capacitor C14 to the set input of flip-flop U17.

When flip-flop U17 sets, the Q output goes high thus causing flip-flop U18 to reset and flip-flop U16 to set. An output is also applied through diode CR13 on line 115 to the timer board (FIG. 5) which causes the counter to reset to zero. Capacitor C15 and resistor R35 delay the output pulse, but eventually cause flip-flop U17 to reset. Transistor Q6, and the associated circuitry, provide for noise suppression at the input to flip-flop U17 and function to hold the set input of that flip-flop low while a reset pulse causes that flip-flop to reset. With flip-flop U18 reset, the $\overline{Q}$ outpt goes high, and this allows current to flow through diode CR12 on line 120 to triac Q2 (FIG. 5) which energizes the rinse solenoid valve and allows water to flow into the tank.

The input to flip-flop U16 is on line 140 from the timer 85. Flip-flop U16 (dual type) forms a divide by four circuit. Since the output on line 140 from the last stage of the counter 85 goes from a low to high each 34 seconds, the Q output of flip-flop U16 will go high after 136 seconds. When this happens, U18 is set causing the $\overline{Q}$ output to switch low and remove gating current from the triac Q2 and deenergizes the rinse solenoid valve.

Thus, the circuit of FIG. 6 causes the rinse solenoid to energize immediately on closure of the fill switch and to remain energized for a predetermined period of time sufficient to allow the wash solution tank to fill.

Figure 7:
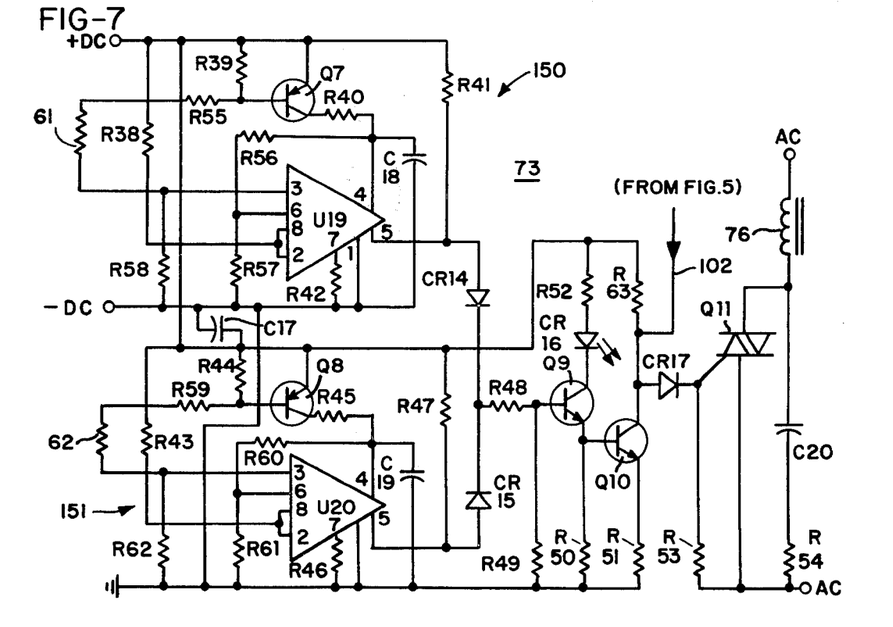
FIG. 7 is an electrical schematic diagram of the motor protection circuit.

Reference is now made to FIG. 7 which is a circuit showing the motor control board 73. This circuit controls the contactor which supplies current to the motor. The primary purpose of this circuit is to protect the motor from overheating, and does this by sensing the motor winding temperature by means of analog temperature sensing elements or thermistors 61 and 62 which are embedded within the motor windings. These thermistors provide a continual monitoring of the motor winding temperature and will cause deenergization of the motor contactor in the event the motor temperature rises above a predetermined level and reenergization of the contactor after the motor temperature has fallen below a second, lower predetermined level. The circuit is also failsafe in that current will be removed from the contactor coil if either of the sensing elements 61 or 62 becomes either shorted or open.

In the embodiment of the invention shown herein, thermistors 61 and 62 are negative temperature coefficient thermistors, that is, they decrease in resistance with increasing temperature. Thermistor 61 is connected to a circuit shown generally at 150 while thermistor 62 is shown connected to an identical sensing circuit 151.

An over temperature condition, a shorted or open thermistor will cause either of these circuits to remove current from the motor contactor coil. Circuit 150 includes a differential amplifier U19 having an input connected directly to thermistor 61. As the temperature of the motor rises, the resistance of thermistor 61 will decrease and causes an increase in the voltage at pin 3 of U19. The output of pin 5 of U19 is low, and therefore Q9 and Q10 are gated off. Gate current is therefore available to triac Q11 through resistor R63 and diode CR17.

When the temperature of thermistor 61 rises above the predetermined value, the output of pin 5 of U19 will suddenly increase, switching on transistors Q9 and Q10, thereby effectively removing the gate current on triac Q11 and causing the contactor 76 to remove power from the motor. As thermistor 61 cools, it will pass the resistance point at which it turned off the motor due to the hysteresis built into the circuit. This hysteresis is established by resistors R56 and R57 which form a voltage divider. When the voltage at pin 3 becomes low enough due to the cooling of thermistor 61, the output eventually will become low to gate off transistors Q9 and Q10, thus allowing gate current to flow to the triac Q11.

If thermistor 61 becomes opened, no base drive will be available to transistor Q7 and therefore no collector current will flow through Q7 to U19. This will cause pin 5 to go high and gate transistors Q9 and Q10 on to turn the motor off. If the thermistor 61 becomes shorted, the input of U19 will be high enough to turn it on and the circuit will operate in the same manner as if the thermistor were heated, thus causing the motor to be turned off. The circuit 151 responds to the thermistor 62 in the same manner as circuit 150 responds to thermistor 61.

A light emitting diode CR16 is connected in series with transistor Q9 to provide a visual indication whenever this transistor is in conduction and gate current is made unavailable to triac Q11.

Figure 8:
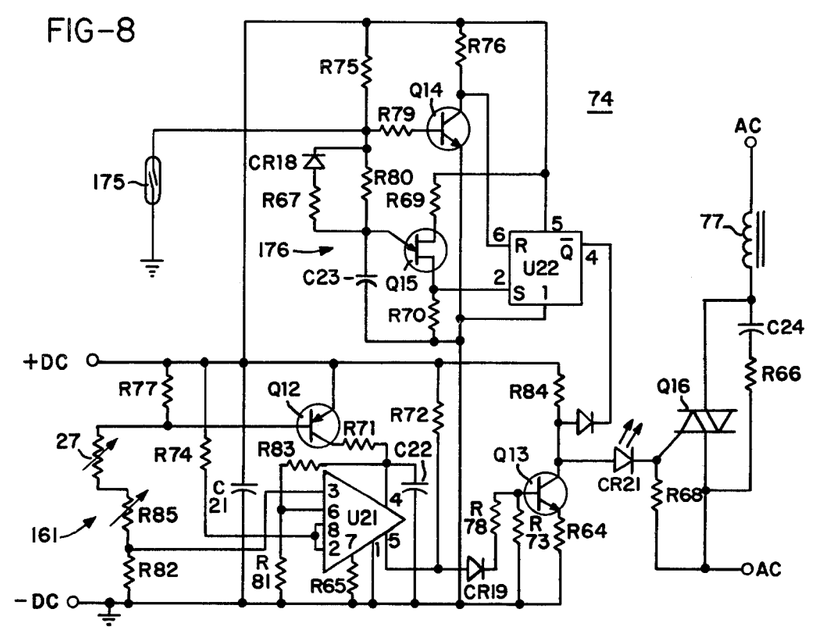
FIG. 8 is an electrical schematic diagram of the water temperature control circuit.

Reference is now made to FIG. 8 and to the circuit diagram showing water temperature control circuit 74. This circuit serves two purposes, the first is to control water temperature, the second is to respond to water level. The selection of water temperature is accomplished by setting a potentiometer R85 mounted on the circuit board, and the temperature of the water is sensed by a thermistor 27. In the preferred embodiment of the invention, the thermistor 27 is inserted into a stainless steel tube and is positioned in the wash tank 20 above the electric heaters 22. The thermistor 27 is connected to a water temperature control circuit 161 which operates in a manner similar to the circuits 150 and 151 of FIG. 7. The circuit 161 includes a voltage divider connected to a voltage level sensing integrated circuit or differential amplifier U21, the output of which is connected to transistor driver Q13 to control the gate current to triac Q16. The triac supplies current for the contactor coil 77 which controls current to the electrical heater in an electrical heater embodiment of the invention or to a solenoid valve in an embodiment of the invention where gas or steam heat is used to raise the water temperature in the wash tank 20.

The thermistor 27 is connected in a voltage divider including potentiometer R85 and a precision resistor R82. The junction between R82 and R85 is connected as one input to a differential amplifier U21. This amplifier circuit is connected in a Schmitt trigger configuration.

The amplifiers U19, U20 and U21 include three transistors and a diode on an integrated circuit chip. Two of these transistors have common emitters and are the ones used in the above Schmitt trigger connection. The third transistor is used as a current source. The diode is used to set the bias of the current source.

Resistor R74 is used to limit current to the base of the current source transistor in the integrated circuit U21. Resistors R71 and R72 are used to set the collector current through the other two transistors in the integrated circuit U21. Resistors R81 and R83 set the proper feedback for hysteresis in the integrated circuit U21.

Transistor Q13 is used to turn off gate current to the triac Q16 when the temperature sensed by the thermistor 27 is above a predetermined value and allows gate current to flow when the temperature sensed by the thermistor 27 is below a second predetermined value. Light emitting diode CR21 is used to indicate when gate current flows to the triac Q16 and therefore indicates when current is flowing in the heater circuit.

Transistor Q12 operates similar to transistors Q7 and Q8 in the circuit shown in FIG. 7 and therefore provides thermistor open circuit protection.

When the thermistor 27 senses an increase in temperature, its resistance will begin to decrease and the voltage applied to the input (pin 3) of integrated circuit U21 begins to increase. At a specified voltage level, which may be adjusted by potentiometer R85, this voltage will become high enough to turn on the first stage of the integrated circuit U21 causing pin 4 to go low and at the same time turning off the second stage within U21, causing pin 5 to go high. When pin 5 of U21 goes high, the transistor Q13 will turn on and thus remove gate current to the triac Q16 and turn off the heat controlled by the coil 77.

As the thermistor 27 begins to cool, it will not cause the heat to turn on at the same voltage level which caused the heat to turn off due to a hysteresis built into the circuit and regulated by feedback resistors R81 and R83. Capacitor 22, as well as capacitors C18 and C19, render the circuit less sensitive to noise from outside sources.

Also mounted with the thermistor 17 in the stainless steel tube is a reed switch 175 which is used to sense low water level. Although not shown, a float assembly 25 contains a magnet which is used to actuate the reed switch 175 when the water level is above the minimum of the level necessary for proper operation of the dishwasher.

The water level reed switch 175 protects the heaters from thermal shock and overheating by preventing heater operation when the water level is low. This is especially useful when the operator turns the heater switch on before filling the tank or where he drains the tank before turning off the heaters.

The reed switch 175, shown in FIG. 8, is connected to a time delay circuit 176 having an output which can remove gate current from the triac Q16 whenever the water level is too low. The time delay circuit 176 has a built in time delay of approximately five seconds to prevent intermittent operation of the coil 77 under those conditions where the pump motor is running and the water level is low, but not low enough to warrant removing current from the heater, thus causing turbulence sufficient to cause intermittent opening and closing of the reed switch contacts. Rapid on off switching of the heaters could cause the contactor associated with the coil 77 to wear out prematurely or cause the steam valve or gate valve associated with the coil 77 to wear out quickly.

The reed switch 175 is connected to the base of transistor Q14 through resistor R79. As long as the reed switch is closed transistor Q14 is gated off causing flip-flop U22 to reset. Therefore, the $\overline{Q}$ output of the flip-flop U22 is high thus allowing Q13 to control the gate current to Q16 in the manner previously described with respect to the FIG. 7 circuitry.

If the reed switch 175 opens, base current originating in resistor R75 will flow in transistor Q14 causing it to turn on. Also, capacitor C23 will charge through resistors R75 and R80. The time constant of this circuit is approximately 5 seconds. When the voltage on capacitor C23 reaches the triggering voltage of unijunction transistor U15, this device will conduct and a pulse will be produced to set flip-flop U22. The $\overline{Q}$ output will go low and short to ground any current flowing from resistor R84 to the gate circuit of triac Q16. Diode CR18 and resistor R67 function to rapidly discharge capacitor C23 when the reed switch is closed so that capacitor C23 starts charging from zero volts when the reed switch is next opened.

The following tables give the values and component designations for the various resistors, capacitors, diodes, transistors and other components described in FIGS. 4–8:

TABLE I

| COMPONENTS | DESCRIPTION (Fig. 4) | | |
|---|---|---|---|
| R1 | 1.0 ohm | ±5% | ½W Carbon Resistor |
| R2 | 2.21K ohm | ±1% | ⅛W Metal Film Resistor |
| R3 | 49.9K ohm | ±1% | ⅛W Metal Film Resistor |
| R4 | 4.64K ohm | ±1% | ⅛W Metal Film Resistor |
| R5 | 1.96K ohm | ±1% | ⅛W Metal Film Resistor |
| CR1 – CR6 | Diode | | |
| C1, C2 | .01mfd | 50V | Disc Capacitor |
| C3 | 1000mfd | 50V | Electrolytic Capacitor |
| C4 | .001mfd | 150V | Disc Capacitor |
| C5 | .1mfd | 50V | Disc Capacitor |
| Q1 | Transistor-Power | | |
| Q22 | Transistor-NPN | | |
| U1 | Voltage Regulator | | |

TABLE II

| COMPONENTS | DESCRIPTION (Fig. 5) | | |
|---|---|---|---|
| R6, R10, R12, R13, R14, R21, R23 | 10K ohm | ±5% | ¼W Carbon Resistor |
| R7 | 2.2K ohm | ±5% | ¼W Carbon Resistor |
| R8, R9, R11, R24 | 1 ohm | ±5% | ¼W Carbon Resistor |
| R15, R25 | 1K ohm | ±5% | ¼W Carbon Resistor |
| R20 | 22 ohm | ±5% | ¼W Carbon Resistor |
| R17, R22 | 47K ohm | ±5% | ¼W Carbon Resistor |
| R18 | 27K ohm | ±5% | ¼W Carbon Resistor |
| R19 | 3.9K ohm | ±5% | ¼W Carbon Resistor |
| R16, R26 | 22K ohm | ±5% | ¼W Carbon Resistor |
| R27 | 1.2K ohm | ±5% | ¼W Carbon Resistor |
| R28, R29, R30 | 1K ohm | ±5% | ½W Carbon Resistor |
| C6, C10, C12 | 0.1 mfd | 50V | Disc Capacitor |
| C8, C9 | .01 mfd | 1.4KV | Disc Capacitor |
| C7, C11 | .01 mfd | 50V | Disc Capacitor |

TABLE II – Continued (Fig. 5)

| COMPONENTS | DESCRIPTION |
|---|---|
| CR7 | Diode - Zener |
| CR8 | Diode - Light Emitting |
| CR9, CR10, CR11 | Diode |
| Q2, Q3 | Triac |
| Q4, Q5 | Transistor - NPN |
| U15, U8, U9, U10 | AND GATE - 3 Input |
| U2, U3, U4, U5, U6, U7 | FLIP-FLOP - Dual Type "T" with Reset |
| U11, U12, U13, U14 | FLIP-FLOP - RS |

TABLE III (FIG. 6)

| COMPONENTS | DESCRIPTION | |
|---|---|---|
| U17, U18 | FLIP-FLOP - RS | |
| U16 | FLIP-FLOP - Dual Type "T" with Reset | |
| Q6 | TRANSISTOR - NPN | |
| CR12, CR13 | DIODE | |
| C14 | .01 mfd | 50V Disc Capacitor |
| C13, C15, C16 | 0.1 mfd | 50V Disc Capacitor |
| R36, R37 | 1 K ohm | ±5% ½W Carbon Resistor |
| R35 | 47 K ohm | ±5% ¼W Carbon Resistor |
| R34 | 27 K ohm | ±5% ¼W Carbon Resistor |
| R33 | 10 K ohm | ±5% ¼W Carbon Resistor |
| R32 | 3.9 K ohm | ±5% ¼W Carbon Resistor |
| R31 | 22 ohm | ±5% ¼W Carbon Resistor |

TABLE IV (Fig. 7)

| COMPONENTS | DESCRIPTION | |
|---|---|---|
| C17 | 0.1 mfd | 50V Disc Capacitor |
| C18, C19 | 2.2 mfd | 20V Tantalum Dipped Capacitor |
| C20 | .01 mfd | 1.4V Disc Capacitor |
| CR14, CR15, CR17 | DIODE | |
| CR16 | DIODE - LIGHT EMITTING | |
| Q7, Q8 | TRANSISTOR - PNP | |
| Q9, Q10 | TRANSISTOR - NPN | |
| Q11 | TRIAC | |
| U19, U20 | DIFFERENTIAL AMPLIFIER | |
| R38, R40, R41, R43, R45, R49 | 3.9K ohm | ±5% ¼W Carbon Resistor |
| R39, R44 | 27K ohm | ±5% ¼W Carbon Resistor |
| R42, R46 | 22 ohm | ±5% ¼W Carbon Resistor |
| R50 | 100 ohm | ±5% ¼W Carbon Resistor |
| R51 | 1 ohm | ±5% ¼W Carbon Resistor |
| R52, R53 | 1K ohm | ±5% ¼W Carbon Resistor |
| R48 | 10K ohm | ±5% ¼W Carbon Resistor |
| R54 | 22K ohm | ±5% ¼W Carbon Resistor |
| R49 | 2.7K ohm | ±5% ¼W Carbon Resistor |
| R55, R59 | 4.75K ohm | ±1% ⅛W Metal Film Resistor |
| R56, R60 | 15.8K ohm | ±1% ⅛W Metal Film Resistor |
| R57, R61 | 2.1K ohm | ±1% ⅛W Metal Film Resistor |
| R58, R62 | 806 ohm | ±1% ⅛W Metal Film Resistor |
| R63 | 1K ohm | ±5% ½W Carbon Resistor |

TABLE V (Fig. 8)

| COMPONENTS | DESCRIPTION | |
|---|---|---|
| R64 | 1 ohm | ±5% ¼W Carbon Resistor |
| R65, R67 | 22 ohm | ±5% ¼W Carbon Resistor |
| R68, R69 | 1K ohm | ±5% ¼W Carbon Resistor |
| R70 | 100 ohm | ±5% ¼W Carbon Resistor |
| R71, R72, R74 | 3.9K ohm | ±5% ¼W Carbon Resistor |
| R75 | 6.8K ohm | ±5% ¼W Carbon Resistor |
| R76 | 10K ohm | ±5% ¼W Carbon Resistor |
| R77, R79 | 27K ohm | ±5% ¼W Carbon Resistor |
| R80 | 1M ohm | ±5% ¼W Carbon Resistor |
| R73 | 2.7K ohm | ±5% ¼W Carbon Resistor |
| R81 | 1.62K ohm | ±1% ⅛W Metal Film Resistor |
| R82 | 2.21K ohm | ±1% ⅛W Metal Film Resistor |

TABLE V – Continued (Fig. 8)

| COMPONENTS | DESCRIPTION | |
|---|---|---|
| R83 | 15.8K ohm | ±1% ⅛W Metal Film Resistor |
| R84 | 1K ohm | ±5% ¼W Carbon Resistor |
| R85 | 20K ohm | ¼W Variable Resistor |
| R66, R78 | 22K ohm | ±5% ¼W Carbon Resistor |
| U21 | Differential Amplifier | |
| U22 | Flip-Flop - RS | |
| C21 | 0.1 mfd | 50V Disc Capacitor |
| C22, C23 | 2.2 mfd | 20V Tantalum Dipped Capacitor |
| C24 | .01 mfd | 1.4KV Disc Capacitor |
| Q12 | Transistor - PNP | |
| Q13, Q14 | Transistor - NPN | |
| Q15 | Transistor - Unijunction | |
| Q16 | Triac | |
| CR18, CR29, CR20 | Diode | |
| CR21 | Diode - Light Emitting | |

All the above described circuits may be used in the commercial dishwasher of FIG. 1 while the power supply, motor protection and the water temperature and level circuits of FIGS. 4, 7 and 8 may be used in the dishwasher of FIG. 2. With respect to the dishwasher of FIG. 1, a customer may order a basic machine with the power supply, timer and water temperature boards, and then add to those circuits optional features, such as a door switch to start the machine operation automatically, the motor protection circuit, if the pump motor is one horsepower or more, the timed fill circuit and the door lock.

The above described circuits may also be employed with a domestic or home dishwasher in lieu of the electromechanical elements which have heretofore been employed in these machines for such functions as determination of cycle operating times and sensing of temperatures. Even though the National Electric code does not currently require incorporation of circuits such as described above in domestic dishwashers, such circuit in integrated circuit form are expected to become less costly than electromechanical elements in the future.

While the forms of apparatus herein described constitute preferred embodiments of the invention, it is to be understood that the invention is not limited to these precise forms of apparatus, and that changes may be made therein without departing from the scope of the invention, which is defined in the appended claims.

What is claimed is:

1. In a dishwasher including
    means including an electric motor operated pump for recirculating washing liquid over articles placed in the dishwasher,
    a storage tank for supplying heated washing liquid to said pump, and
    means for heating the washing liquid in said storage tank,
    the improvement comprising, in combination,
    first temperature responsive resistance means in thermal relation to said motor and first electronic circuit means responsive to the resistance of said first temperature responsive means for interrupting the flow of electrical current to said motor when the motor temperature increases above a predetermined level, and
    second temperature responsive resistance means in thermal contact with the liquid in said storage tank and second electronic circuit means responsive to the resistance of said second temperature responsive means for controlling said heating means to maintain said liquid at a predetermined elevated temperature.

2. The dishwasher of claim 1 further including liquid level sensing means for indicating when the level of washing liquid in said storage tank falls below a predetermined level,
    circuit responsive means to said sensing means to disconnect said heating means during low water level conditions, and
    time delay means connected to the output of said liquid level sensing means to prevent an indication of low liquid level during momentary fluctuations in said liquid level of sufficient magnitude to actuate said sensing means.

3. The dishwasher of claim 1 further including means for indicating visually when the current to said motor is interrupted by reason of an over temperature condition.

4. The dishwasher of claim 1 further including means for indicating visually when said heating means is supplying heat to the washing liquid in said storage tank.

5. The dishwasher of claim 1 further including means for interrupting the current to said motor in the event said first temperature responsive means becomes open circuited.

6. The dishwasher of claim 1 further including means for disconnecting said heating means in the event said second temperature responsive means becomes open circuited.

* * * * *

UNITED STATES PATENT AND TRADEMARK OFFICE
Certificate

Patent No. 3,911,943                          Patented October 14, 1975

Stuart E. Athey, Alan Lee Vore and Donald E. Swihart

Application having been made by Stuart E. Athey, Alan Lee Vore and Donald E. Swihart, the inventors named in the patent above identified, and Hobart Corporation, Troy, Ohio, a corporation of Ohio, the assignee, for the issuance of a certificate under the provisions of Title 35, Section 256, of the United States Code, adding the name of William C. Schlieper as a joint inventor, and a showing and proof of facts satisfying the requirements of the said section having been submitted, it is this 20th day of April 1976, certified that the name of the said William C. Schlieper is hereby added to the said patent as a joint inventor with the said Stuart E. Athey, Alan Lee Vore and Donald E. Swihart.

FRED W. SHERLING,
*Associate Solicitor.*